(12) United States Patent
Maxfield (10) Patent No.: US 12,521,488 B2
(45) Date of Patent: Jan. 13, 2026

(54) MEDICAMENT DELIVERY DEVICE (71) Applicant: SHL MEDICAL AG, Zug (CH)

(72) Inventor: Brian Maxfield, Delray Beach, FL (US)

(73) Assignee: SHL Medical AG, Zug (CH)

( * ) Notice: Subject to any disclaimer, the term of this patent is extended or adjusted under 35 U.S.C. 154(b) by 925 days.

(21) Appl. No.: 17/774,265

(22) PCT Filed: Oct. 12, 2020

(86) PCT No.: PCT/EP2020/078624
§ 371 (c)(1),
(2) Date: May 4, 2022

(87) PCT Pub. No.: WO2021/094045
PCT Pub. Date: May 20, 2021

(65) Prior Publication Data
US 2022/0387712 A1     Dec. 8, 2022

Related U.S. Application Data

(60) Provisional application No. 62/933,530, filed on Nov. 11, 2019.

(30) Foreign Application Priority Data

Dec. 11, 2019  (EP) ..................................... 19215365

(51) Int. Cl.
*A61M 5/20* (2006.01)
*A61M 5/315* (2006.01)
(Continued)

(52) U.S. Cl.
CPC ...... *A61M 5/2033* (2013.01); *A61M 5/31511* (2013.01); *A61M 5/3243* (2013.01); *A61M 5/46* (2013.01); *A61M 2005/3267* (2013.01)

(58) Field of Classification Search
CPC .............. A61M 5/2033; A61M 5/3243; A61M 2005/2013
See application file for complete search history.

(56) References Cited

U.S. PATENT DOCUMENTS

2015/0367072 A1*  12/2015  Constantineau ........ A61M 5/32
                                                            604/91
2019/0022327 A1    1/2019   Frost et al.

FOREIGN PATENT DOCUMENTS

WO    2017/060017 A1    4/2017
WO    2017/198383 A1   11/2017
WO    2018/192750 A1   10/2018

OTHER PUBLICATIONS

International Search Report and Written Opinion for Int. App. No. PCT/EP2020/078624, mailed Nov. 10, 2020.

* cited by examiner

*Primary Examiner* — Bradley J Osinski
(74) *Attorney, Agent, or Firm* — McDonnell Boehnen Hulbert & Berghoff LLP (57) ABSTRACT

A medicament delivery device is presented having a housing with an inner surface structure, a delivery member cover slidably arranged in the housing, a medicament container housing arranged in the housing, a rotator configured to cooperate with the inner surface structure, the rotator being in axial engagement with the medicament container housing, wherein the delivery member cover is configured to be moved axially from an extended position relative to the housing to a retracted position, thereby causing the rotator to rotate from a first rotator position to a second rotator position, a forward-biased plunger rod extending through the rotator and having a first axial engagement position with the rotator when the rotator is in the first rotator position and in the second rotator position, wherein the rotator has an (Continued)

engagement structure configured to engage with the inner surface structure when the rotator is in the first rotator position to prevent forward movement of the rotator, and wherein the rotator is configured to disengage from the inner surface structure when the rotator is rotated from the first rotator position towards the second rotator position, causing the rotator, the plunger rod and the medicament container housing to move forward an auto-penetration distance in the housing.

18 Claims, 10 Drawing Sheets

(51) Int. Cl.
  *A61M 5/32* (2006.01)
  *A61M 5/46* (2006.01)

MEDICAMENT DELIVERY DEVICE

CROSS REFERENCE TO RELATED APPLICATIONS

The present application is a U.S. National Phase Application pursuant to 35 U.S.C. § 371 of International Application No. PCT/EP2020/078624 filed Oct. 12, 2020, which claims priority to U.S. Provisional Patent Application No. 62/933,530 filed Nov. 11, 2019 and European Patent Application No. 19215365.8 filed Dec. 11, 2019. The entire disclosure contents of these applications are herewith incorporated by reference into the present application.

TECHNICAL FIELD

The present disclosure generally relates to medicament delivery devices provided with auto-penetration functionality.

BACKGROUND

Administration of some medicaments require an injection at a certain depth. Therefore, medicament delivery devices may be provided with an auto-penetration functionality. Hereto, an sub-assembly comprising the delivery member, typically a needle, is moved forward a predetermined distance automatically when the medicament delivery device is triggered. This forward movement causes the delivery member to be inserted to the required depth into the site of delivery.

WO2017/198383 A1 discloses a medicament delivery device with auto-penetration functionality. This document discloses an administration mechanism for a medicament delivery device, comprising: a linearly displaceable medicament delivery member cover, an actuator sleeve, and an actuator configured to be received by the actuator sleeve. The medicament delivery member cover is configured to axially displace the actuator sleeve from an initial position to a distally displaced position thereby displacing the actuator sleeve relative to the actuator. The administration mechanism further comprises a rotator having a guide structure and configured to be received by the actuator, a plunger holder configured to be received by and engage with the rotator, and a plunger rod. The rotator and plunger holder are configured to be proximally biased, and the plunger is rod configured to be received by and engage with the plunger holder in the initial position of the actuator sleeve. The plunger rod is configured to be proximally biased, wherein the actuator is configured to engage with the plunger holder in the initial position of the actuator sleeve, thereby preventing the plunger holder from proximal displacement relative to the actuator, wherein the actuator is configured to be released from engagement with the plunger holder by displacement of the actuator sleeve towards the distally displaced position, thereby enabling proximal displacement of the plunger holder, the plunger rod and the rotator relative to the actuator, whereby the actuator is configured to engage with the guide structure of the rotator and to rotate the rotator relative to the plunger holder, releasing the plunger rod from the plunger holder.

The configuration which provides the auto-penetration functionality may be rather bulky.

SUMMARY

An object of the present disclosure is to provide a medicament delivery device which solves or at least mitigates problems of the prior art.

There is hence provided a medicament delivery device comprising: a housing having an inner surface structure, a delivery member cover slidably arranged in the housing, a medicament container housing arranged in the housing, a rotator configured to cooperate with the inner surface structure, the rotator being in axial engagement with the medicament container housing, wherein the delivery member cover is configured to be moved axially from an extended position relative to the housing to a retracted position, thereby causing the rotator to rotate from a first rotator position to a second rotator position, a forward-biased plunger rod extending through the rotator and having a first axial engagement position with the rotator when the rotator is in the first rotator position and in the second rotator position, wherein the rotator has an engagement structure configured to engage with the inner surface structure when the rotator is in the first rotator position to prevent forward movement of the rotator, and wherein the rotator is configured to disengage from the inner surface structure when the rotator is rotated from the first rotator position towards the second rotator position, causing the rotator, the plunger rod and the medicament container housing to move forward an auto-penetration distance in the housing.

The auto-penetration functionality is hence obtained by means of the rotator instead of relying on a triple-layer configuration of an actuator sleeve, an actuator holder and a plunger holder as in WO2017/198383. The three-layer arrangement of WO2017/198383 is hence replaced by fewer layers. The auto-penetration assembly may therefore be made more compact.

According to one embodiment the engagement structure comprises a radially outwards extending first arm and a radially outwards extending second arm.

According to one embodiment the engagement structure comprises a first rotator guide track structure. The inner surface structure may in this case comprise one or more radially inwards extending structures, such as pins, configured to cooperate with the guide track structure.

According to one embodiment the inner surface structure comprises a first circumferential shelf portion extending in the circumferential direction and configured to cooperate with the first arm and a second circumferential shelf portion extending in the circumferential direction configured to cooperate with the second arm.

According to one embodiment the rotator and the medicament container housing are configured to move forward the auto-penetration distance to an inner penetration stop surface, wherein the plunger rod is configured to disengage from its axial engagement with the rotator when the medicament container housing hits the inner penetration stop surface, allowing the plunger rod to continue to move forward inside the housing.

According to one embodiment the inner penetration stop surface forms part of the housing or is defined by an inner front surface of the delivery member cover.

According to one embodiment one of the rotator and the plunger rod has an radial inner protrusion and the other one of the rotator and the plunger rod has a groove structure configured to cooperate with the inner protrusion, providing axial engagement between the rotator and the plunger rod in the first rotator position and the second rotator position.

According to one embodiment the groove structure has a circumferential groove portion extending in the circumferential direction and an axially parallel groove portion extending towards a rear end of the housing, the circumferential groove portion transitioning into the axially parallel groove portion.

According to one embodiment the inner protrusion is arranged in the circumferential groove portion in the first rotator position and in the axially parallel groove portion in the second rotator position.

According to one embodiment the axially parallel groove portion has a radially stop structure configured to engage with the inner protrusion in the second rotator position as long as a force acting on the radial stop structure exerted by the inner protrusion is smaller than a threshold value, and to disengage from the inner protrusion when the force reaches the threshold value, causing the inner protrusion to run in the axially parallel groove portion, thereby releasing the plunger rod from axial engagement with the rotator.

According to one embodiment the radial stop structure is arranged in parallel with a rear wall of the circumferentially extending groove portion to maintain the first axial engagement position of the plunger rod in the first rotator position and the second rotator position. The radial stop structure may hence have a front or proximal stop surface, which is arranged in level or parallel with the rear wall of the circumferentially extending groove portion. Thus, as the inner protrusion moves in the circumferentially extending groove from the first rotator position to the second rotator position, the inner protrusion is maintained in the same or essentially the same axial position relative to the plunger rod, first by means of the rear wall and then by means of the radial stop structure.

According to one embodiment the rotator is provided with the inner protrusion and the plunger rod is provided with the groove structure.

According to one embodiment the delivery member cover has a delivery member cover engagement structure and the rotator has an external track structure configured to cooperate with the delivery member cover engagement structure to transform linear motion of the delivery member cover to rotational motion of the rotator.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
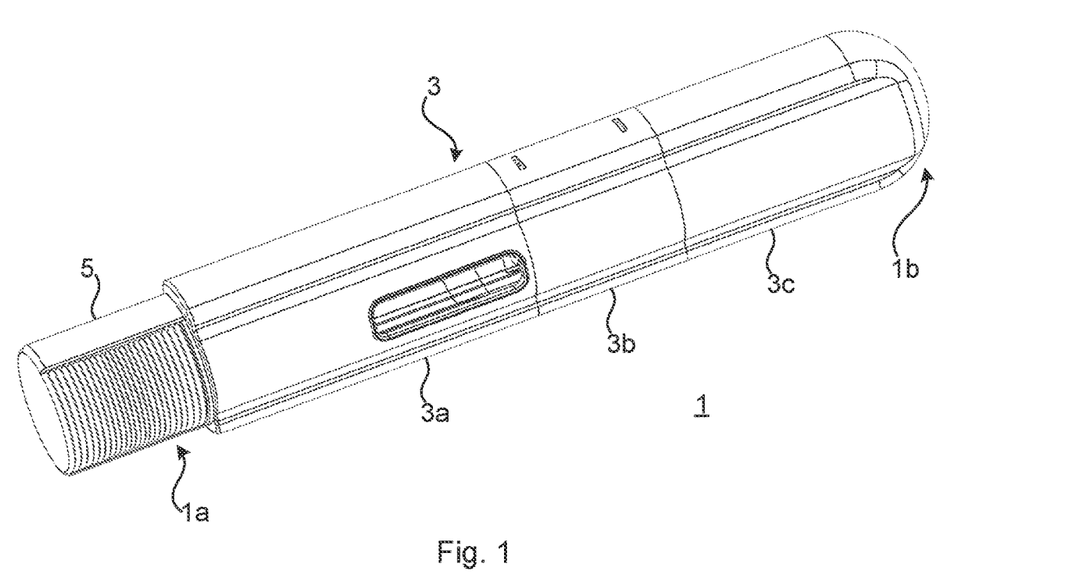
FIG. 1 shows a perspective view of an example of a medicament delivery device.

FIG. 1 shows a perspective view of an example of a medicament delivery device 1. The medicament delivery device 1 may for example be an auto-injector.

The medicament delivery device 1 comprises a housing 3. In the present example, the housing 3 comprises three housing parts, namely a front housing member 3a, a rear housing member 3c, and a middle housing member 3b arranged between the front housing member 3a and the rear housing member 3c in the longitudinal direction of the medicament delivery device 1. The housing could alternatively be made of fewer housing parts, such as one or two, or more than three housing parts.

The medicament delivery device 1 has a front end 1a and a rear end 1b. The medicament delivery device 1 has a detachable cap 5. The cap 5 forms part of the front end 1a of the medicament delivery device 1 when the cap 5 is attached to the housing 3. The front end 1a means that end of the medicament delivery device 1 which faces the site of injection when in use. The rear end 1b is the opposite end of the medicament delivery device 1 relative to the front end 1a. The front end 1a may alternatively be referred to as the proximal end of the medicament delivery device 1. The rear end 1b may alternatively be referred to as the distal end of the medicament delivery device 1.

Figure 2:
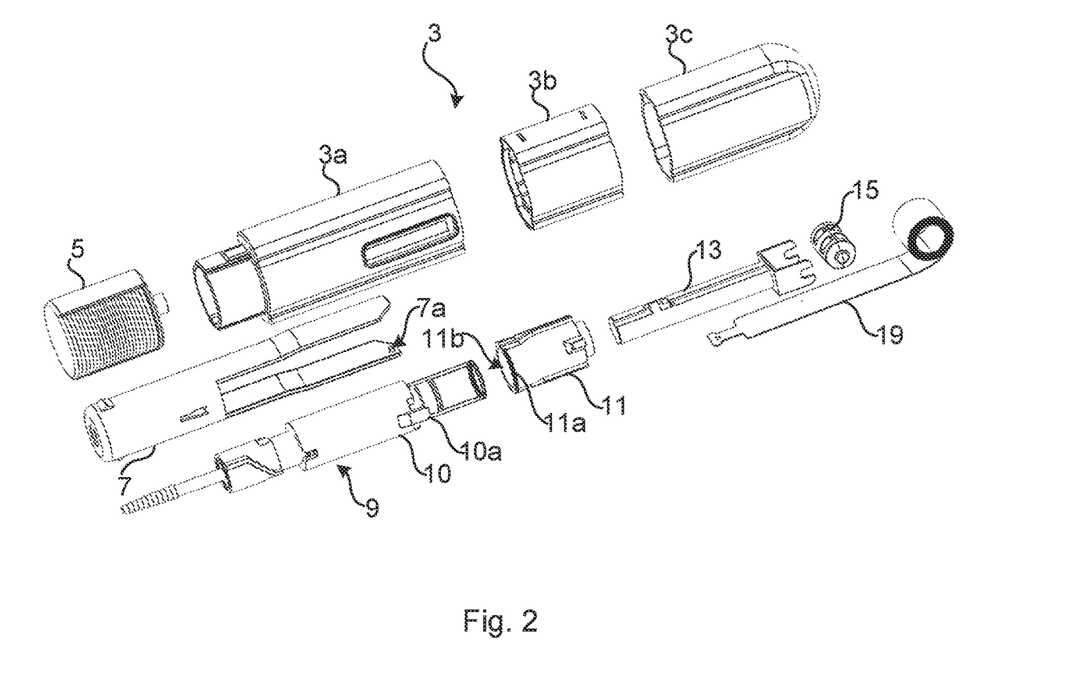
FIG. 2 depicts an exploded view of the medicament delivery device in FIG. 1.

With reference to FIG. 2, an exploded view of the medicament delivery device 1 is shown. The exemplified medicament delivery device 1 comprises a delivery member cover 7. The delivery member cover 7 is configured to be slidably arranged in the housing 3. The delivery member cover 7 is configured to be moved axially inside the housing 3 between an extended position and a retracted position. The delivery member cover 7 is configured to be biased towards the extended position.

The medicament delivery member 1 may be provided with a priming functionality. The medicament delivery device 1 may hence be arranged in an initial state which is an un-primed state. The medicament delivery device 1 may be in this state before the cap 5 is removed. In this case, the cap 5 presses the delivery member cover 7 inwards into the housing 3 towards the retracted position. The delivery member cover 7 is thus arranged in an un-primed position. When the cap 5 is removed, the delivery member cover 7 is released and due to forward-biasing moved axially from the un-primed position to the extended position.

The medicament delivery device 1 furthermore comprises a medicament delivery assembly 9. The medicament delivery assembly 9 comprises a medicament container housing 10 configured to receive a medicament container, and a delivery member such as a needle, for example a double-sided needle, configured to be in fluid connection with the medicament container. In case the medicament delivery device 1 is provided with priming functionality, the delivery member may be a double-sided needle that may be moved rearwards, towards the rear end 1b of the medicament delivery device 1, when the delivery member cover 7 is moved from the un-primed position towards the extended position thereby rupturing a septum arranged in the medicament container. Since this aspect does not form part of the present disclosure, and since many different variations of such priming functionality can be realised, this feature will not be discussed in any further detail herein.

The medicament delivery device 1 comprises a rotator 11. The rotator 11 has an axial through-opening 11b. The rotator 11 is configured to axially engage with the medicament container housing 10. The rotator 11 is configured to be rotatable relative to the medicament container housing 10. The rotator 11 may have a lip 11a extending along its front perimeter. The medicament container housing 10 may have a flexible arm 10a configured to engage with the lip 11a to prevent axial displacement between the rotator 11 and the medicament container housing 10 and to enable relative rotation between the rotator 11 and the medicament container housing 10.

The delivery member cover 7 is configured to cooperate with the rotator 11. The delivery member cover 7 is configured to cause rotation of the rotator 11 from a first rotator position to a second rotator position when the delivery member cover 7 is moved from the extended position towards the retracted position. Moreover, in case the medicament delivery device 1 is provided with priming functionality, the delivery member cover 7 is configured to cause rotation of the rotator 11 from an initial rotator position to the first rotator position when moved from the un-primed position towards the extended position. The delivery member cover 7 has a delivery member cover engagement structure 7a configured to engage with the rotator 11 such that linear motion of the delivery member cover 7 causes rotation of the rotator 11. The delivery member cover engagement structure 7a may for example comprise a pin. The pin may be extending radially inwards.

The medicament delivery device 1 comprises a plunger rod 13. The plunger rod 13 is configured to extend through the rotator 11. The plunger rod 13 is configured to extend through the axial through-opening 11b of the rotator 11.

The plunger rod 13 is configured to be forward-biased. The plunger rod 13 is hence configured to be biased towards the front end 1a of the medicament delivery device 1. The medicament delivery device 1 comprises a resilient member 19 configured to forward-bias the plunger rod 13. The resilient member 19 may for example be a spiral spring as shown FIG. 2, or a coil spring. In the present example, the medicament delivery device 1 comprises a resilient member holder 15 configured to be connected to the plunger rod 13 and to the resilient member 19. The resilient member 19 may furthermore be connected to the housing 3.

Figure 3:
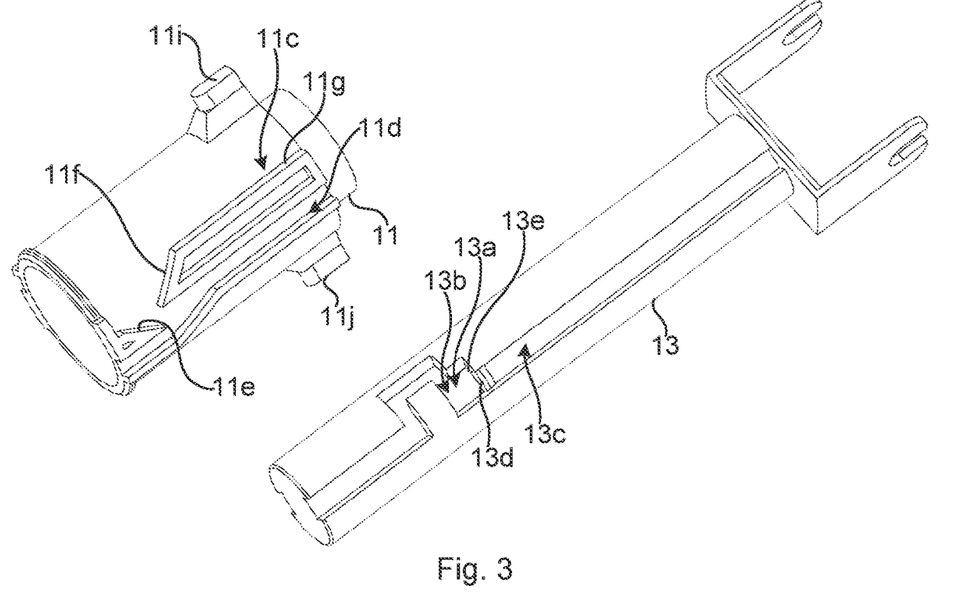
FIG. 3 shows a perspective view of a plunger rod and a rotator.

FIG. 3 shows the exemplified rotator 11 in more detail. The rotator 11 is provided with an external track structure 11c. The external track structure 11c is provided on the external surface of the rotator 11. The external track structure 11c is configured to cooperate with the engagement structure 7a of the delivery member cover 7. The external track structure 11c comprises a first axial track portion 11d which faces a first spiral track portion 11e. The first spiral track portion 11e faces a second spiral track portion 11f, which is spiralling in the opposite direction relative to the first spiral track portion 11e and arranged further towards the rear end of the rotator 11 in relation to the first spiral track portion 11e. The second spiral track portion 11e transitions into a second axial track portion 11g parallel with the first axial track portion 11d.

The rotator 11 is provided with an engagement structure 11i, 11j. The engagement structure 11i, 11j is configured to engage with an inner surface structure of the housing 3 to prevent axial forward movement of the rotator 11 when the rotator 11 is arranged in the first rotator position. The engagement structure 11i, 11j is arranged to prevent axial movement of the rotator 11 when the rotator 11 is in the initial rotator position. The exemplified engagement structure comprises a radially outwards extending first arm 11i and a radially outwards extending second arm 11j.

The exemplified plunger rod 13 is provided with a groove structure 13a. The groove structure 13a is configured to cooperate with a radial inner protrusion 11h of the rotator 11 shown in FIG. 4. The groove structure 13a and the inner protrusion 11h provide axial engagement between the plunger rod 13 and the rotator 11.

Figure 4:
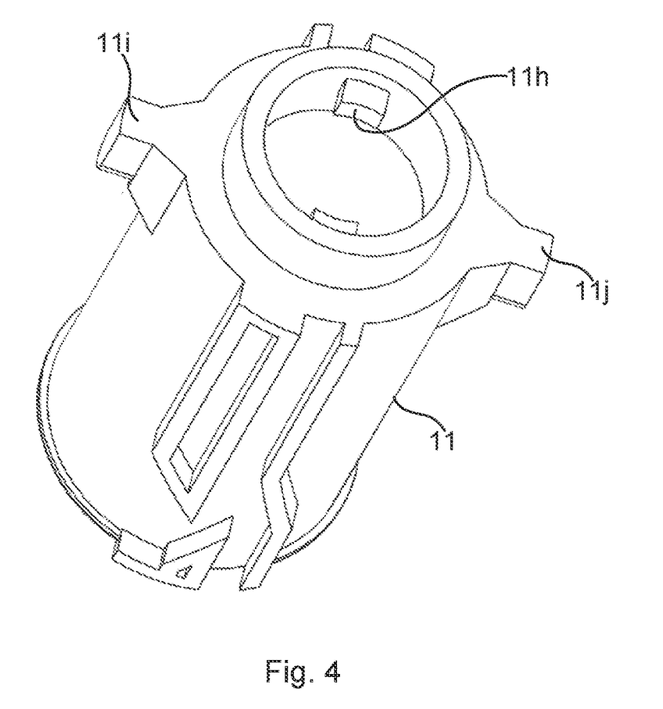
FIG. 4 is a perspective view of the rotator in FIG. 3.

In the present example, the inner protrusion 11h extends radially inwards from an inner surface of the rotator 11. The groove structure 13a has a stair-like configuration. The stair-like configuration may comprise several steps. The groove structure 13a has a circumferential groove portion 13b and an axially parallel groove portion 13c. The circumferential groove portion 13b extends in the circumferential direction of the plunger rod 13. The axially parallel groove portion 13c may be a straight track extending parallel with a central axis of the plunger rod 13. The axially parallel groove portion 13c may according to one example extend all the way to the rear end of the plunger rod 13. The circumferential groove portion 13b transitions into the axially parallel groove portion 13c. The transitioning of the circumferential groove portion 13b to the axially parallel groove portion 13c may be in a front portion of the plunger rod 13, i.e. in a forward direction relative to the midpoint of the plunger rod 13 along the longitudinal axis of the plunger rod 13. Alternatively, the transitioning may be in a middle portion or a rear portion of the plunger rod, depending on the design of the medicament delivery device based on the dosage that is to be delivered.

The axially parallel groove portion 13c is provided with a radial stop structure 13d. The radial stop structure 13d is in level with a rear wall 13e of the circumferentially extending groove portion 13b. Alternatively, the radial stop structure may be arranged somewhat rearwards relative to the rear wall. The radial stop structure 13d has a smaller radial extension from the bottom of the groove structure 13a than the rear wall. The radial stop structure 13d is configured engage with the inner protrusion 11h of the rotator 11 when the rotator 11 is in the second rotator position. The radial stop structure 13d is configured to prevent the inner protrusion 11h to move into the axially parallel groove portion 13c as long as a force acting on the radial stop structure 13d exerted by the inner protrusion 11h is below a threshold value. When the force reaches or exceeds the threshold value, the inner protrusion 11h will move over and past the radial stop structure 13d.

The position of the radial inner protrusion 11h in the groove structure 13a depends on the position of rotation of the rotator 11 relative to the housing 3. As can be understood from FIG. 3 and as will be elaborated upon in the following, the different rotational positions of the rotator 11 enables axial forward movement of the plunger rod 13 relative to the housing 3 due to it being forward-biased.

It should be noted that alternatively, the plunger rod could for example be provided with the radial protrusion and the rotator could be provided with the groove structure. In this case, the radial protrusion would be a radially outwards extending protrusion.

Figure 5:
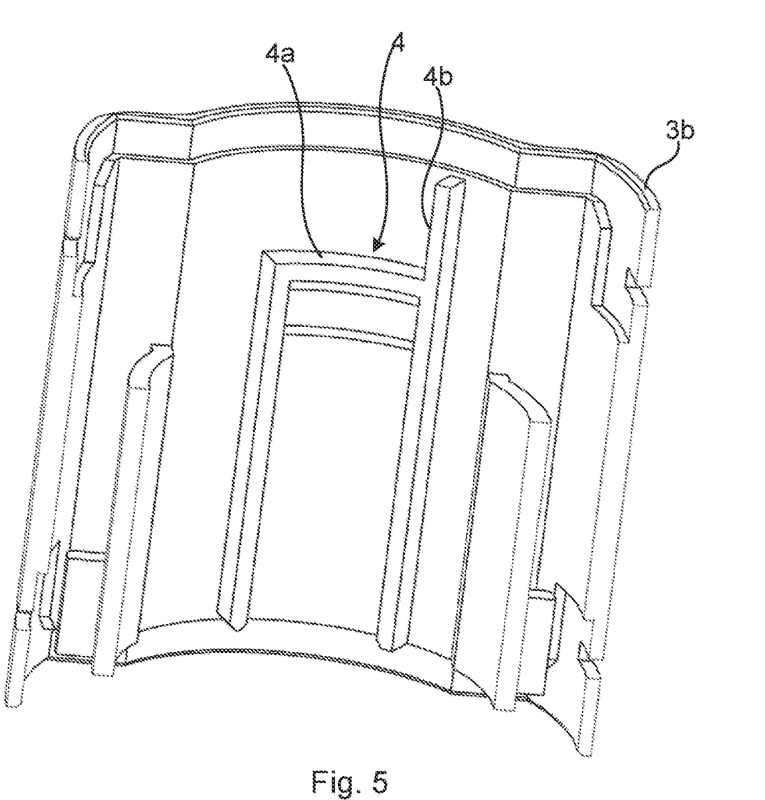
FIG. 5 is a longitudinal section of the housing of the medicament delivery device in FIG. 1.

FIG. 5 shows a longitudinal section of the housing 3. FIG. 5 in particular shows the middle housing member 3b. The housing 3, in this example the middle housing member 3b, has an inner surface structure 4 configured to engage with the engagement structure 11i, 11j of the rotator 11. The inner surface structure 4 may comprise a first circumferential shelf portion 4a extending in the circumferential direction of the medicament delivery device 1. The inner surface structure 4 may also comprise a second circumferential shelf portion (not shown) extending in the circumferential direction of the medicament delivery device 1. The first circumferential shelf portion 4a is configured to support the first arm 11i. The second circumferential shelf portion is configured to support the second arm 11j.

The first circumferential shelf portion 4a is provided along only a portion of the inner circumference of the housing 3. The second circumferential shelf portion is provided along only a portion of the inner circumference of the housing 3.

The inner surface structure 4 may be provided with a circumferential stop 4b configured to restrict rotation of the rotator 11 in a first direction. The circumferential stop 4b may extend axially from the first circumferential shelf portion 4a, thereby acting as a stop for the first arm 11i. The inner surface structure 4 may also be provided with a corresponding circumferential stop that extends axially from the second circumferential shelf portion, thereby acting as a stop for the second arm 11j.

Figure 6:
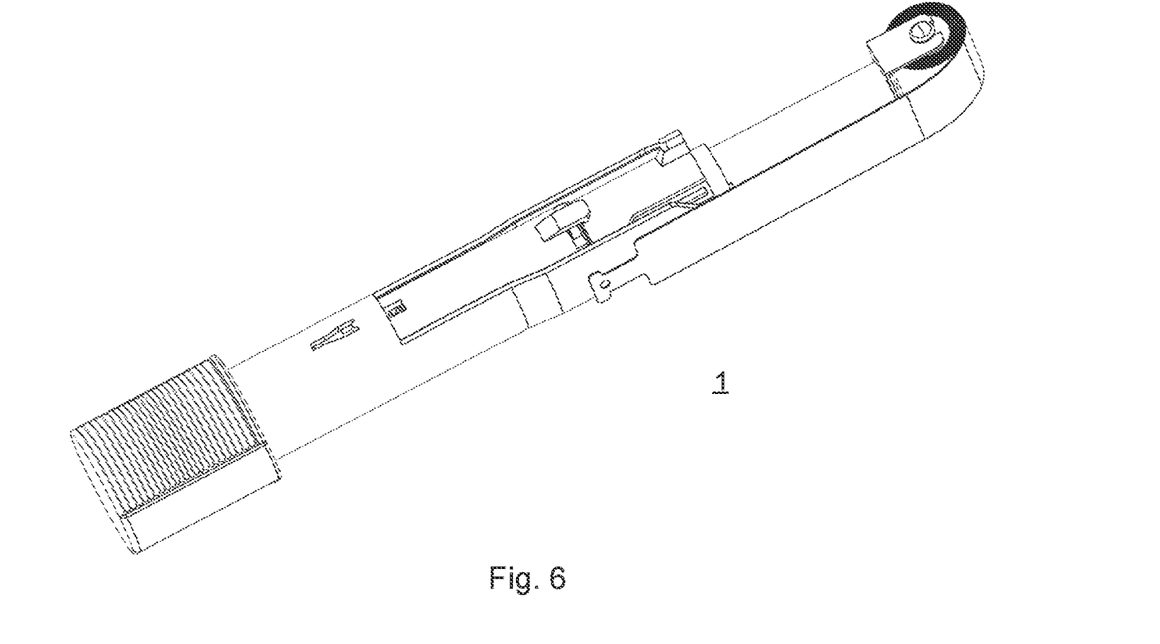
FIG. 6 depicts the medicament delivery device in FIG. 1 without its housing in an initial state.

FIG. 6 shows the medicament delivery device 1 without the housing 3 in the initial state.

Figure 7:
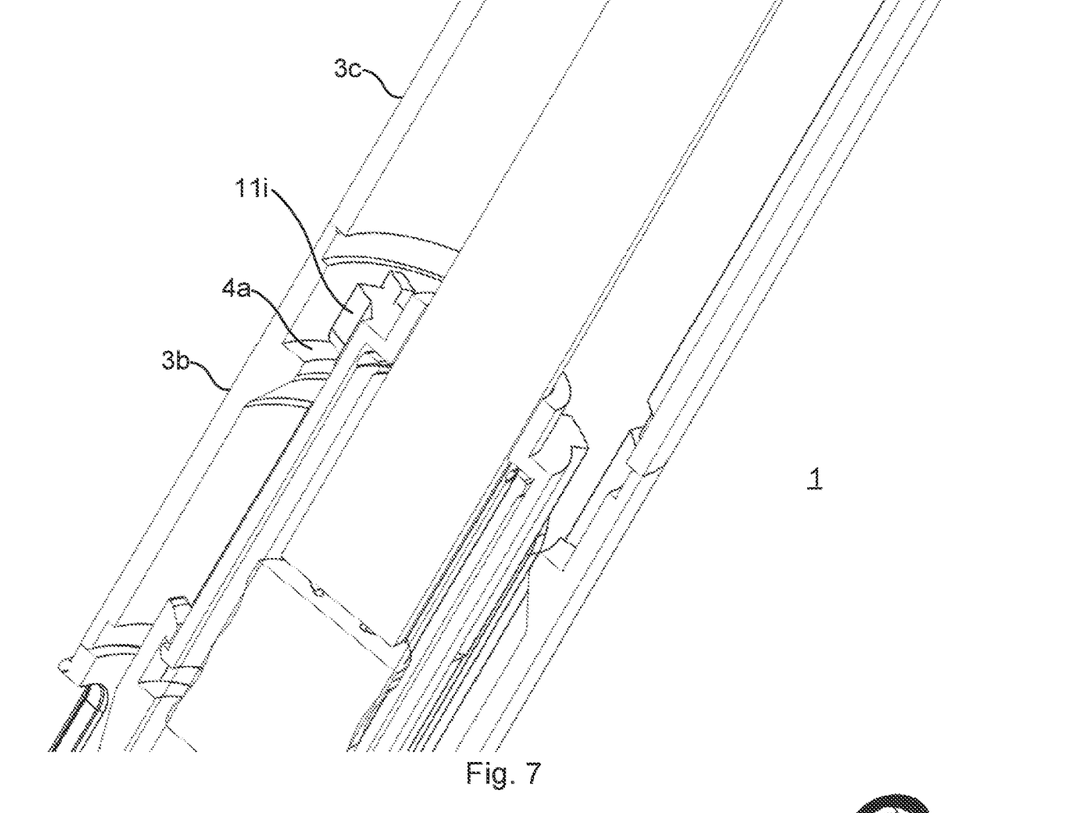
FIG. 7 is a longitudinal section of the medicament delivery device 1 in the initial state, showing the interaction between the housing and the rotator.
Figure 12:
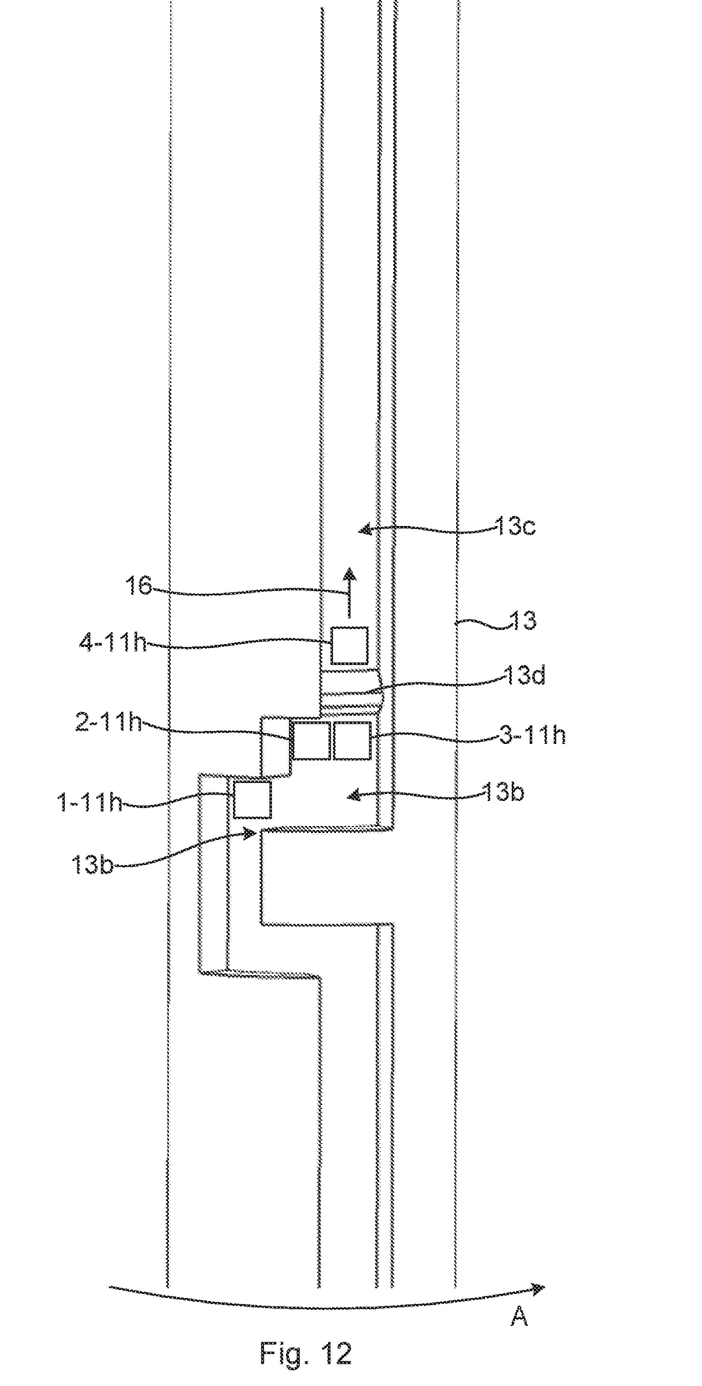
FIG. 12 shows the plunger rod and the relative axial engagement position with the rotator in various states of the medicament delivery device.

FIG. 7 shows that the first arm 11i is supported by the first circumferential shelf portion 4a in the initial state of the medicament delivery device 1. As shown in FIG. 12, the inner protrusion 11h may in this case be arranged in a position in the groove structure 13a which is located one step in the forward direction in the stair-like configuration of the groove structure 13b, from the circumferentially extending groove portion 13b. The position of the inner protrusion 11h is indicated by the square in position 1-11h. Arrow A indicates the direction of rotation of the rotator 11 relative to the plunger rod 13, as it rotates from the initial rotator position towards the second rotator position.

Figure 8:
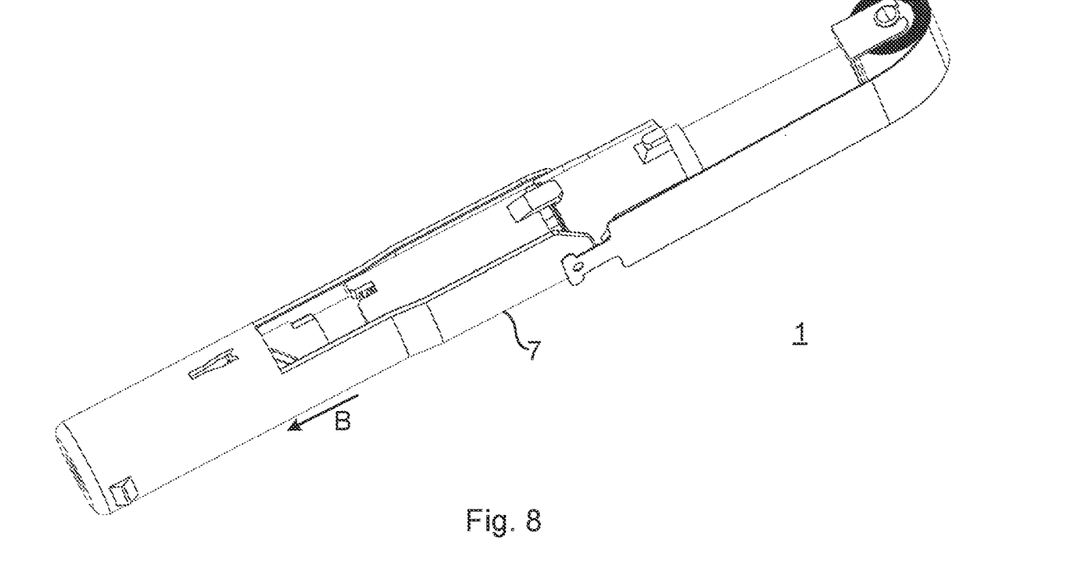
FIG. 8 shows the medicament delivery device in a primed state.

FIG. 8 shows the medicament delivery device 1 in a primed state without the housing 3. The delivery member cover 7 has in this case moved in the direction shown by arrow B from the un-primed position to the extended position relative to the housing 3. The movement of the delivery member cover 7 has been initiated by removing the cap 5 from the housing 3, causing the forward-biased delivery member cover 7 to move to the extended position. The forward-movement of the delivery member cover 7 causes the rotator to rotate from the initial rotator position to the first rotator position. This rotation of the rotator 11 is obtained by cooperation of the delivery member cover engagement structure 7a with the external guide track structure 11c of the rotator 11, as the delivery member cover engagement structure 7a is moved from a rear end of the external guide track structure 11c along the first axial track portion 11d towards the first spiral track portion 11e. The cooperation between the first spiral track portion 11e and the delivery member cover engagement structure 7a causes the rotation of the rotator 11 from the initial rotator position to the first rotator position.

Figure 9:
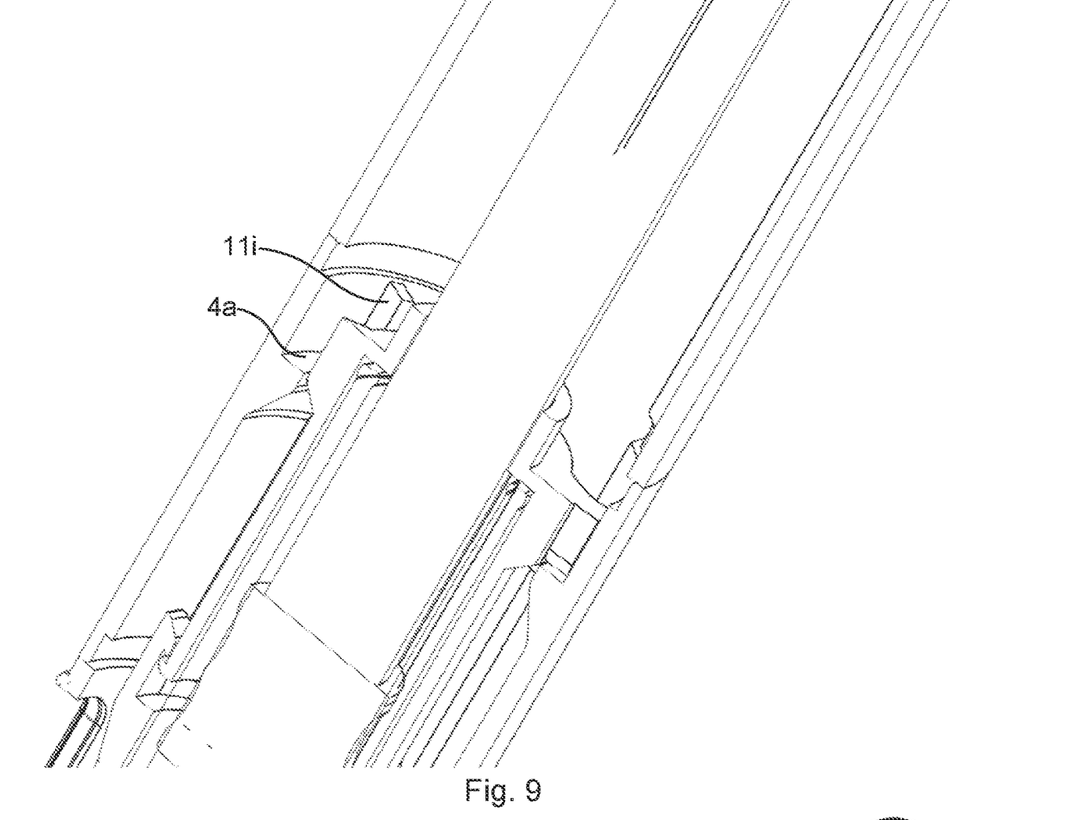
FIG. 9 is a longitudinal section of the medicament delivery device 1 in the primed state, showing the interaction between the housing and the rotator.

FIG. 9 shows that the first arm 11i has slid along the first circumferential shelf portion 4a as the rotator 11 has been rotated from the initial rotator position to the first rotator position. Further, FIG. 12 shows that the inner protrusion 11h of the rotator 11 has moved from the position 1-11h to the position 2-11h as the rotator 11 has been rotated relative to the plunger rod 13. This relative rotation between the rotator 11 and the plunger rod 13 has resulted in that the inner protrusion 11h has moved one step along the stair-like configuration of the groove structure 13a. This movement causes the plunger rod 13 to move in the forward direction towards the front end 1a of the medicament delivery device 1. The plunger rod 13 has thereby attained a first axial engagement position with the rotator 11. The movement of the plunger rod 13 provides a priming operation of the medicament delivery device 1 as the plunger rod 13 moves further into the medicament container, pushing any air contained in the medicament container out from the medicament container through the delivery member.

Figure 10:
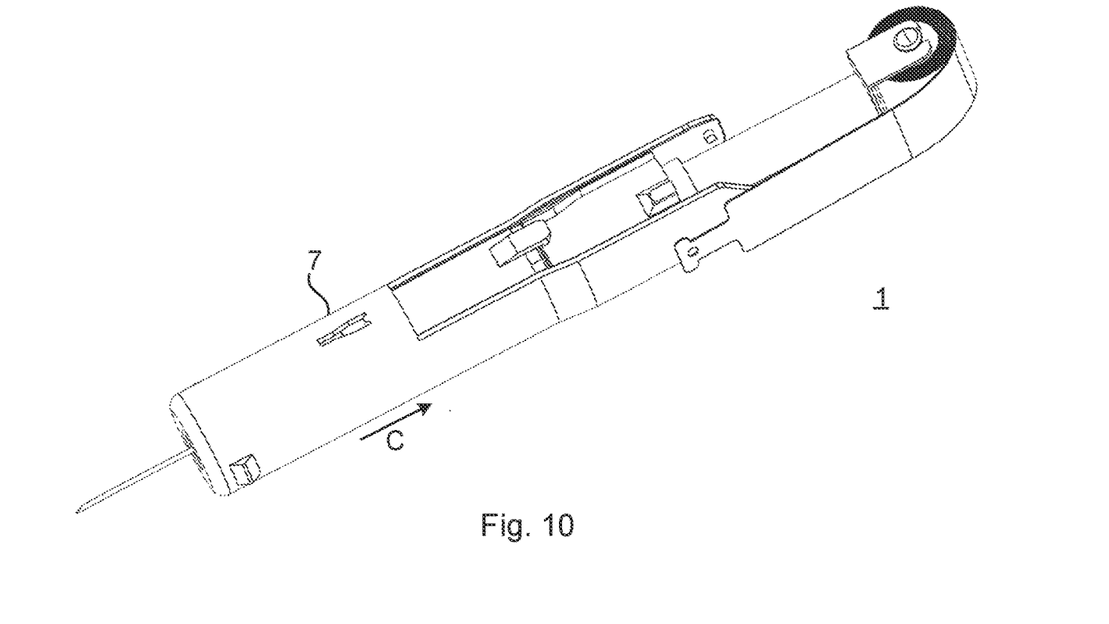
FIG. 10 depicts the medicament delivery device in a triggered state.

FIG. 10 shows the medicament delivery device 1 in a triggered state without the housing 3. The delivery member cover 7 has been moved inwards into the housing 3, towards the rear end 1b of the medicament delivery device 1 to the retracted position. The delivery member cover 7 has thereby cooperated with the rotator 11, causing the rotator 11 to be rotated from the first rotator position to the second rotator position. This rotation of the rotator 11 is obtained by the delivery member cover engagement structure 7a cooperating with the external guide track structure 11c, in particular with the second spiral track portion 11f as the delivery member cover 7 is moved rearwards in the housing 3.

Figure 11:
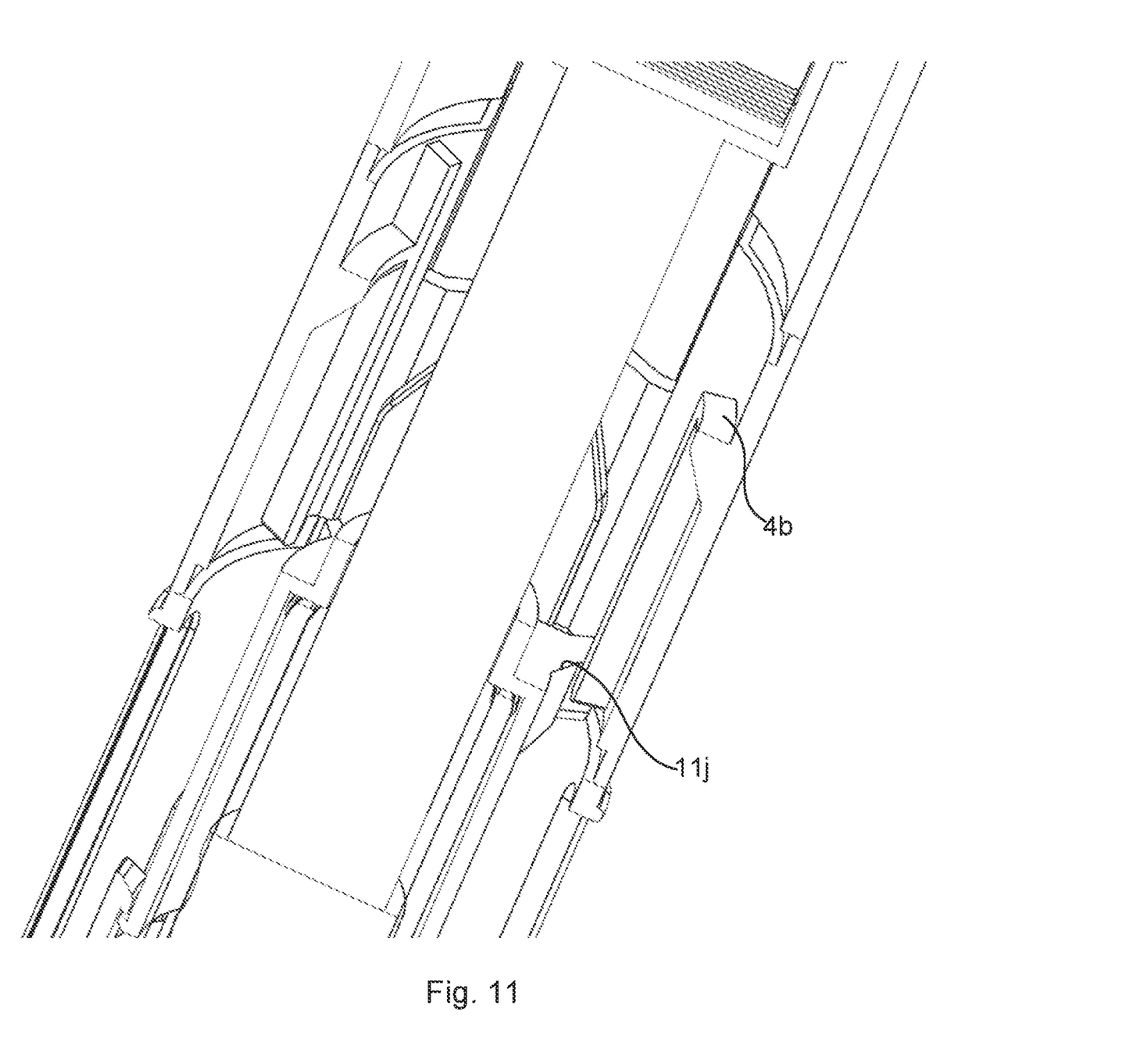
FIG. 11 shows the medicament delivery device when auto-penetration has been performed.

FIG. 11 shows the corresponding interaction between the second arm 11j and the second circumferential shelf portion 4b. The rotator 11 has been rotated such an amount as it moves from the first rotator position towards the second rotator position that the first arm 11i and the second arm 11j move past their respective shelf portion 4a, 4b, causing the rotator 11 which is axially engaged with the forward-biased plunger rod 13 to be released from the housing 3 and move concurrently with the plunger rod 13 and the medicament container housing 10 with which the rotator 11 is axially locked forward an auto-penetration distance inside the housing 3. FIG. 12 shows the position 3-11h of the inner protrusion 11h of the rotator 11 as the rotator 11 reaches the second rotator position. The inner protrusion 11h is in this case still arranged in the circumferential groove portion 13b but aligned with the axially parallel groove portion 13c. The radial stop structure 13*d* prevents the plunger rod 13 to disengage from the rotator 11.

When the rotator 11, the plunger rod 13 and the medicament container housing 10 has moved the auto-penetration distance, the medicament container housing 10 hits or impacts with an inner penetration stop surface of the medicament delivery device 1. The inner penetration stop surface may for example form part of the housing 3 or be defined by an inner front surface of the delivery member cover 7. The impact causes the rotator 11 to exert a force onto the radial stop structure 13*d* which reaches or exceeds the threshold. The plunger rod 13 is thereby disengaged from the rotator 11. The plunger rod 13 is thereby able to continue its forward movement in the housing 3 without the rotator 11 and the medicament container housing 10. FIG. 12 shows position 4-11*h* of the inner protrusion 11*h* when the rotator 11 has been disengaged from the plunger rod 13. Arrow 16 shows in which direction the position of the inner protrusion 11*h* will continue to move as the plunger rod 13 continues to move forward in the housing 3 after it has been released from engagement with the rotator 11.

Figure 13:
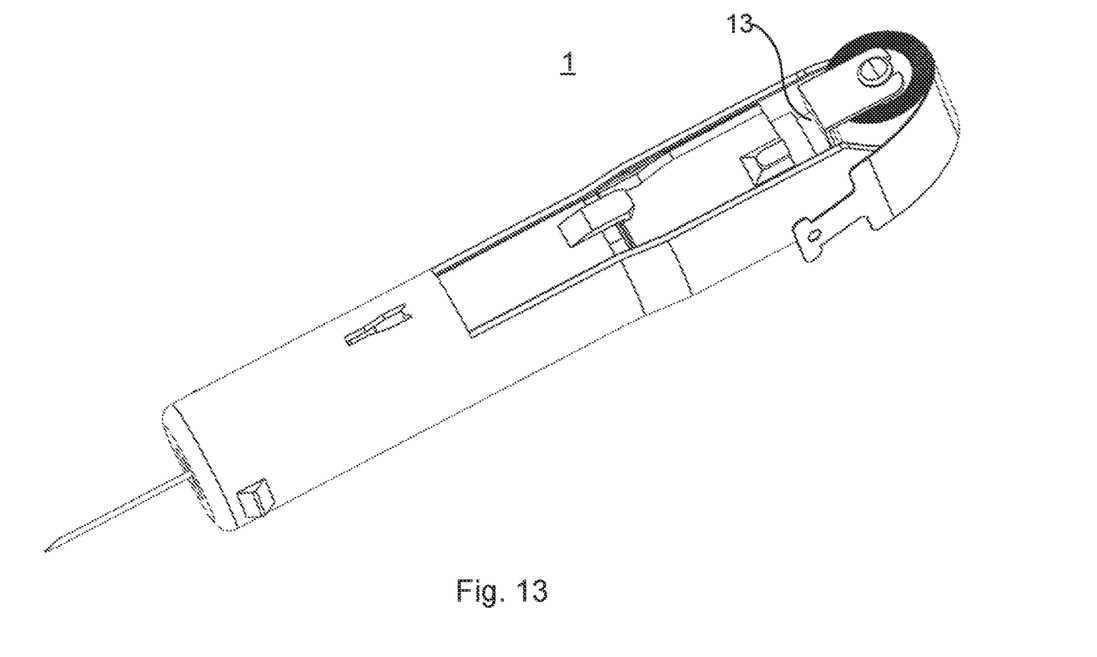
FIG. 13 depicts the medicament delivery device after medicament administration but before the delivery member cover has slid back to its extended position relative to the housing.

FIG. 13 shows the medicament delivery device 1 in a completed delivery state, in which the plunger rod 13 has moved completely forward to expel medicament from the medicament container. The delivery member cover 7 is still in the retracted position.

Figure 14:
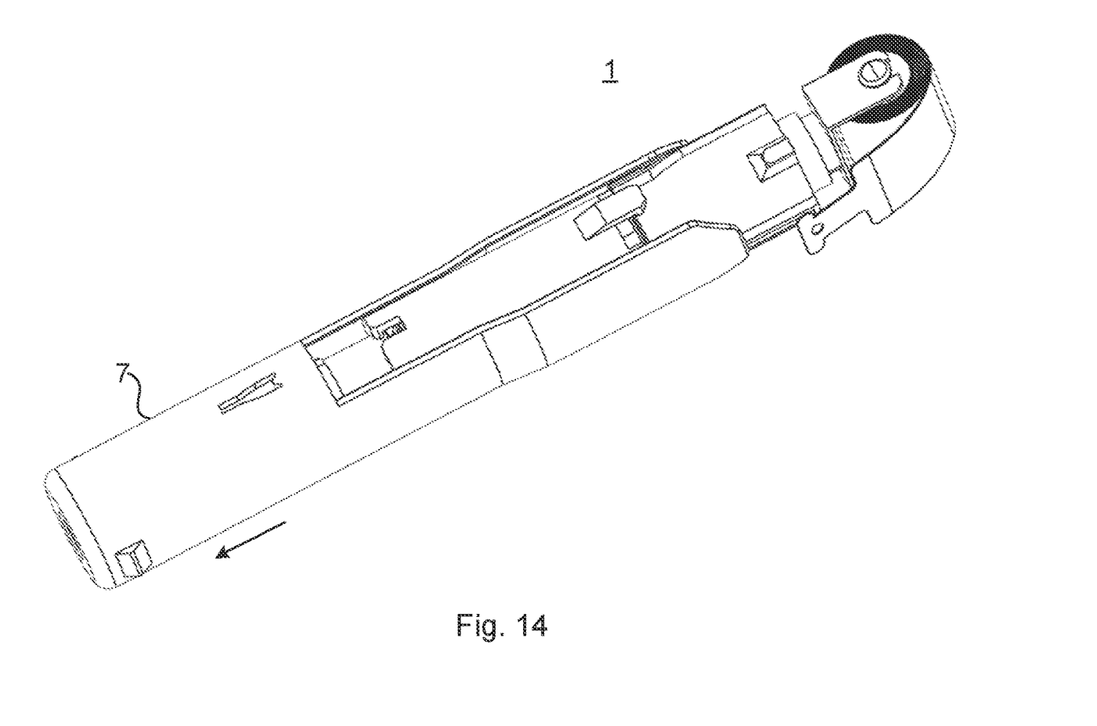
FIG. 14 shows the medicament delivery device when the delivery member cover has been released and returned to its extended position.

FIG. 14 shows the medicament delivery device 1, when the delivery member cover 7 has been released and moved to the extended position due to it being forward-biased. This is the final state of the medicament delivery device 1.

Figure 15:
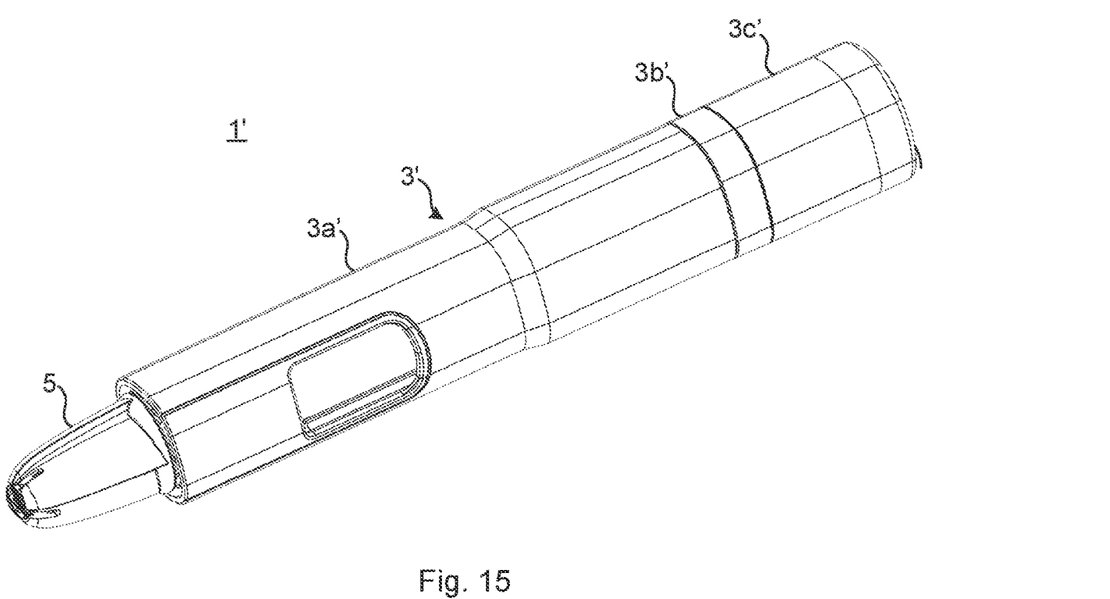
FIG. 15 is a perspective view of another example of a medicament delivery device.
Figure 16:
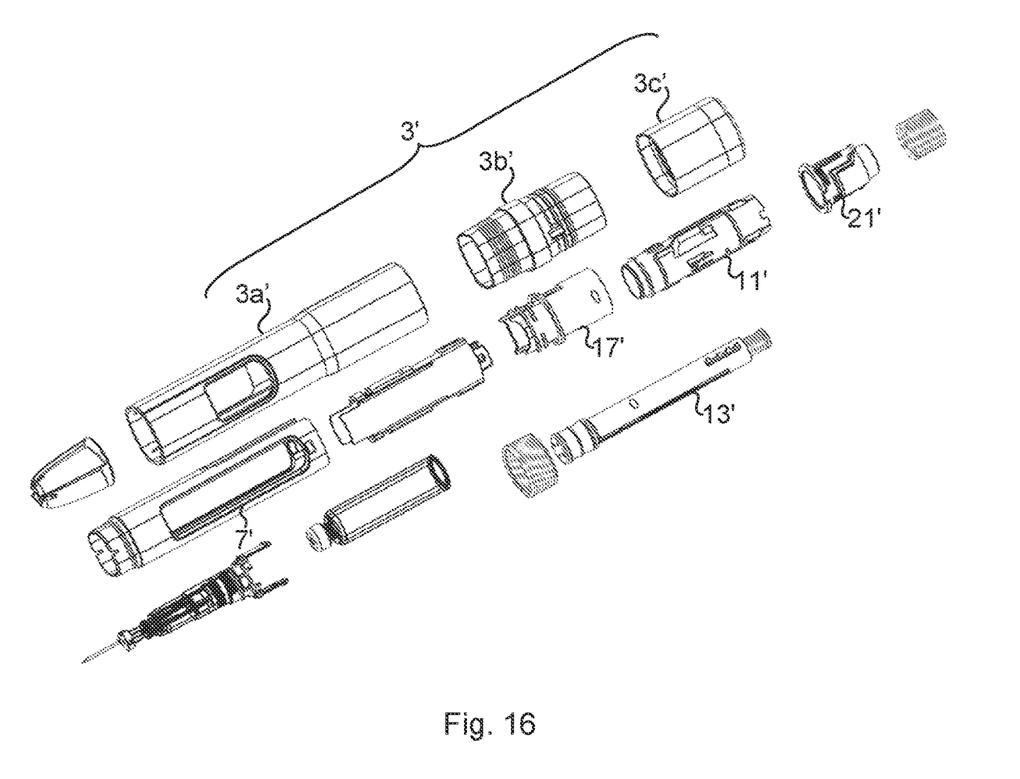
FIG. 16 is an exploded view of the medicament delivery device in FIG. 15.

FIG. 15 shows a perspective view of another example of a medicament delivery device 1'. FIG. 16 shows an exploded view of the medicament delivery device'. Medicament delivery device 1' is somewhat similar to medicament delivery device 1. The medicament delivery device 1' comprises a housing 3' comprising housing parts 3*a*'-3*c*', and a delivery member cover 7'. The delivery member cover 7' is slidably arranged in the housing 3' in a similar manner as described in the first example.

The medicament delivery device 1' comprises a plunger rod 13', a sleeve 17', a rotator 19' and a rotator sleeve 21'. The sleeve 17' is configured to be connected to the delivery member cover 7' such that axial movement of the delivery member cover 7' causes axial movement of the sleeve 17' and vice versa.

The rotator 19' and the rotator sleeve 21' form a rotator structure. The rotator 11' and the rotator sleeve 21' are rotationally locked relative to each other. Rotation of the rotator 11' hence causes rotation of the rotator sleeve 21 with the same amount of rotation as the rotator 11'. The rotator 11' and the rotator sleeve 21' are axially locked relative to each other. Thus, axial movement of the rotator 11' causes the same amount of axial movement of the rotator sleeve 21' and vice versa. The rotator 11' and the rotator sleeve 21' engage with each other to provide axial and rotational locking between the rotator 11' and the rotator sleeve 21'. The rotator sleeve 21' is arranged closer to the rear end of the medicament delivery device 1' than the rotator 11'.

According to one variation, the sleeve 17' may be discarded with. In this case, the delivery member cover 7 may be configured to directly cooperate with the rotator structure.

According to one example, the rotator 19' and the rotator sleeve 21' could for example be integral, i.e. forming a single component.

The housing 3' has in inner surface structure configured to cooperate with the rotator sleeve 21'. The inner surface structure may for example comprise a radially inwards extending structures such as one or more pins configured to cooperate with the rotator sleeve 21'.

The rotator 11' and the plunger rod 13' are configured to cooperate with each other. Such cooperation may for example be provided by similar means as described in the previous example.

In the example in FIG. 16, the sleeve 17' is configured to cooperate with the rotator 11' such that axial movement of the sleeve 17' is transformed to rotational motion of the rotator 11'.

Figure 17:
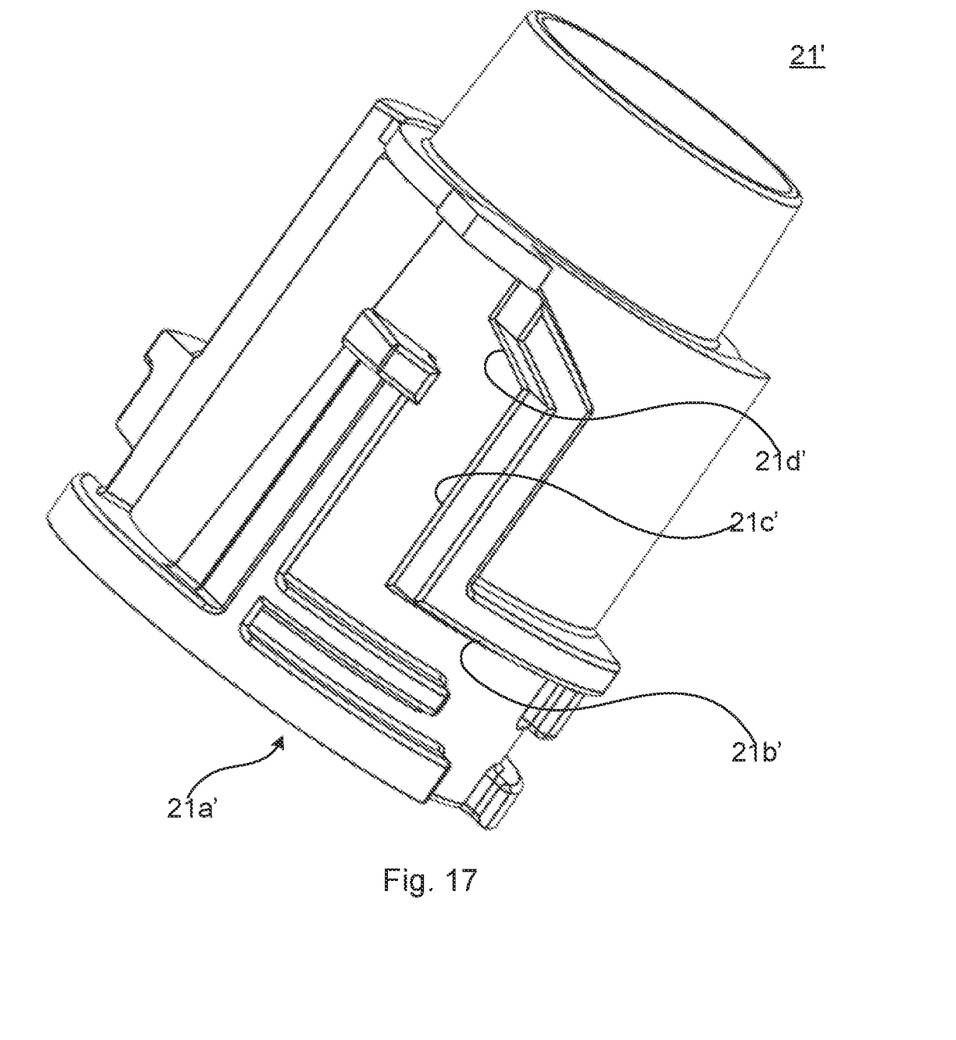
FIG. 17 is a perspective view of an example of a rotator sleeve of the medicament delivery device shown in FIG. 15.

FIG. 17 is a perspective view of the rotator sleeve 21'. The rotator sleeve 21' is provided with an engagement structure 21*a*' configured to cooperate with the inner surface structure of the housing. The engagement structure 21' comprises a first rotator guide track structure 21*a*'. The first rotator guide track structure 21*a*' is arranged on the outer surface of the rotator sleeve 21'. The first rotator guide track structure 21*a*' comprises a circumferentially radially outwards extending rib portion 21*b*'. The first rotator guide track structure 21*a*' comprises an axial radially outwards extending rib portion 21*c*'. The circumferentially radially outwards extending rib portion 21*b*' transitions to the axial radially outwards extending rib portion 21*c*'. The axially radially outwards extending rib portion 21*c*' extends rearwards relative to the circumferentially radially outwards extending rib portion 21*c*'. The first rotator guide track structure 21*a*' comprises an inclined or helical radially outwards extending rib portion 21*d*'. The axially outwards extending rib portion 21*c*' transitions to the helical radially outwards extending rib portion 21*d*'. The helical radially outwards extending rib portion 21*d*' is arranged rearwards relative to the axially outwards extending rib portion 21*c*'.

As the rotator 11' is rotated from the first rotator position to the second rotator position, the rotator sleeve 21' is rotated concurrently with the rotator 11'. The first rotator guide track structure 21*a*' is thereby moved relative to the inner surface structure of the housing 3'. The inner surface structure of the housing 3 is thereby moved along the circumferentially radially outwards extending rib portion 21*b*' of the rotator sleeve 21' until it moves past the edge where the circumferentially radially outwards extending rib portion 21*b*' transitions to the axial radially outwards extending rib portion 21*c*'. The rotator 11' and the rotator sleeve 21', which is biased in the forward direction, are thereby moved forward as the rotator sleeve 21' is released from engagement with the inner surface structure of the housing. Auto-penetration is thereby performed. The inclined or helical radially outwards extending rib portion 21*d*' will after some forward movement of the rotator sleeve 21' cooperate with the inner surface structure, causing a final rotation of the rotator sleeve 21' and the rotator 11'. The rotator 11' thereby disengages from the plunger rod 13', enabling the plunger rod 13' to move further forward in a medicament container. Medicament expulsion is thereby performed.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A medicament delivery device comprising:
   a housing having an inner surface structure,
   a delivery member cover slidably arranged in the housing,
   a medicament container housing arranged in the housing, a rotator configured to cooperate with the inner surface structure, the rotator being in axial engagement with the medicament container housing, wherein the delivery member cover is configured to be moved axially from an extended position relative to the housing to a retracted position, thereby causing the rotator to rotate from a first rotator position to a second rotator position, a forward-biased plunger rod extending through the rotator and having a first axial engagement position with the rotator when the rotator is in the first rotator position and in the second rotator position, wherein the rotator has an engagement structure configured to engage with the inner surface structure when the rotator is in the first rotator position to prevent forward movement of the rotator, and wherein the rotator is configured to disengage from the inner surface structure when the rotator is rotated from the first rotator position towards the second rotator position, causing the rotator, the plunger rod and the medicament container housing to move forward an auto-penetration distance in the housing.

2. The medicament delivery device as claimed in claim 1, wherein the engagement structure comprises a radially outwards extending first arm and a radially outwards extending second arm.

3. The medicament delivery device as claimed in claim 2, wherein the inner surface structure comprises a first circumferential shelf portion extending in the circumferential direction and configured to cooperate with the first arm and a second circumferential shelf portion extending in the circumferential direction configured to cooperate with the second arm.

4. The medicament delivery device as claimed in claim 1, wherein the rotator and the medicament container housing are configured to move forward the auto-penetration distance to an inner penetration stop surface, wherein the plunger rod is configured to disengage from its axial engagement with the rotator when the medicament container housing hits the inner penetration stop surface, allowing the plunger rod to continue to move forward inside the housing.

5. The medicament delivery device as claimed in claim 4, wherein the inner penetration stop surface forms part of the housing or is defined by an inner front surface of the delivery member cover.

6. The medicament delivery device as claimed in claim 1, wherein one of the rotator and the plunger rod has a radial inner protrusion and the other one of the rotator and the plunger rod has a groove structure configured to cooperate with the inner protrusion, providing axial engagement between the rotator and the plunger rod in the first rotator position and the second rotator position.

7. The medicament delivery device as claimed in claim 6, wherein the groove structure has a circumferential groove portion extending in the circumferential direction and an axially parallel groove portion extending towards a rear end of the housing, the circumferential groove portion transitioning into the axially parallel groove portion.

8. The medicament delivery device as claimed in claim 7, wherein the inner protrusion is arranged in the circumferential groove portion in the first rotator position and in the axially parallel groove portion in the second rotator position.

9. The medicament delivery device as claimed in claim 8, wherein the axially parallel groove portion has a radial stop structure configured to engage with the inner protrusion in the second rotator position as long as a force acting on the radial stop structure exerted by the inner protrusion is smaller than a threshold value, and to disengage from the inner protrusion when the force reaches the threshold value, causing the inner protrusion to run in the axially parallel groove portion, thereby releasing the plunger rod from axial engagement with the rotator.

10. The medicament delivery device as claimed in claim 9, wherein the radial stop structure is arranged in parallel with a rear wall of the circumferentially extending groove portion to maintain the first axial engagement position of the plunger rod in the first rotator position and the second rotator position.

11. The medicament delivery device as claimed in claim 6, wherein the rotator is provided with the inner protrusion and the plunger rod is provided with the groove structure.

12. The medicament delivery device as claimed in claim 1, wherein the delivery member cover has a delivery member cover engagement structure and the rotator has an external track structure configured to cooperate with the delivery member cover engagement structure to transform linear motion of the delivery member cover to rotational motion of the rotator.

13. An activation mechanism for a medicament delivery device having a housing enclosing a medicament container, the activation mechanism comprises:
a housing having an inner surface structure,
a rotator in sliding and rotational engagement with the inner surface structure of the housing, where the rotator has an inside surface;
a delivery member cover slidably arranged within the housing and operatively engaged with an outer surface of the rotator during activation of the medicament delivery device;
a plunger rod comprising an outer surface that is slidably and rotationally engaged with the inside surface of the rotator; and
a resilient member operationally connected to the plunger rod to bias the plunger rod in a proximal direction prior to the activation of the medicament delivery device,
wherein axial movement of the delivery member cover causes rotation of the rotator and disengagement from the inner surface of the housing such that the rotator, plunger rod and medicament container housing moves proximally relative to the housing.

14. The activation mechanism of claim 13, wherein the outer surface of the plunger rod comprises a circumferential groove portion located proximal to an axially parallel groove portion.

15. The activation mechanism of claim 14, wherein the circumferential groove portion comprises a rear wall and the axially parallel groove portion comprises a radial stop structure.

16. The activation mechanism of claim 15, wherein the rear wall maintains the plunger rod in a first axial position when the rotator rotates from a first position to a second position.

17. The activation mechanism of claim 15, wherein the radial stop structure prevents relative axial movement of the plunger rod relative to the rotator after rotation of the rotator.

18. The activation mechanism of claim 17, wherein a protrusion on an inner surface of the rotator will move out of engagement with the radial stop structure when a threshold force exerted on the radial stop structure by the protrusion is exceeded to cause the plunger rod to move axially in a proximal direction.

* * * * *